J. M. LUNGUEST.
Garden Implements.
No. 146,083.
Patented Dec. 30, 1873.
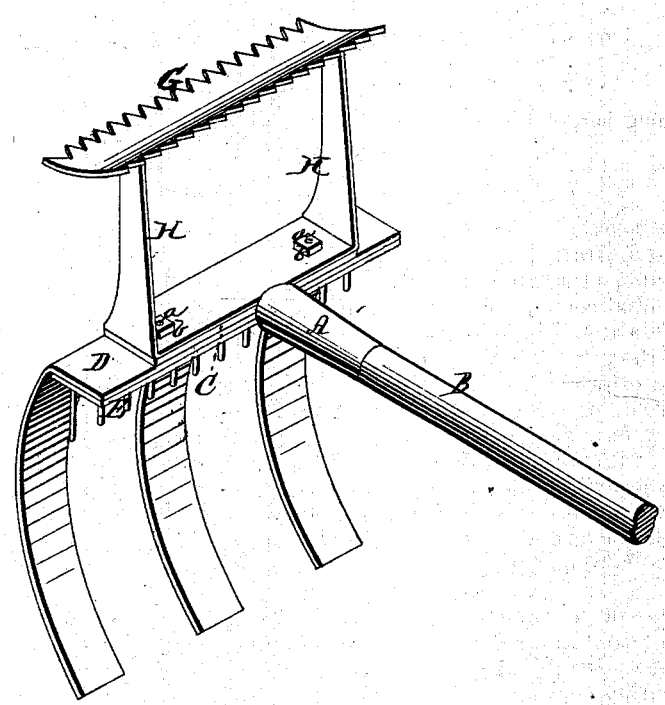
Witnesses
John A. Ellis
E. E. Ellis
Inventor.
John M. Lunguest
Per
T. H. Alexander & Co.
atty's

UNITED STATES PATENT OFFICE.

JOHN M. LUNGUEST, OF ATLANTA, GEORGIA.

IMPROVEMENT IN GARDEN IMPLEMENTS.

Specification forming part of Letters Patent No. 146,083, dated December 30, 1873; application filed July 18, 1873.

*To all whom it may concern:*

Be it known that I, JOHN M. LUNGUEST, of Atlanta, in the county of Fulton and State of Georgia, have invented certain new and useful Improvements in Garden Implements; and I do hereby declare that the following is a full, clear, and exact description thereof, reference being had to the accompanying drawings, and to the letters of reference marked thereon, which form a part of this specification.

The nature of my invention consists in the construction and arrangement of a garden implement and handle for attaching various implements, as will be hereinafter more fully set forth.

In order to enable others skilled in the art to which my invention appertains to make and use the same, I will now proceed to describe its construction and operation, referring to the annexed drawings, in which the figure is a perspective view of my garden implement.

A represents a socket or ferrule of any suitable size, for the insertion of a handle, B. In this end of the handle is inserted a shank formed in the center of a bar, C, thus forming a T. To this bar C garden implements are secured by means of bolts $a\ a$ and thumb-nuts $b\ b$. One implement may be attached on each side of the bar C, if so desired. D represents a hoe formed of three curved blades, attached to or made part of a bar or plate, which is fastened to the bar C. E represents a rake made of a straight bar or plate, with a series of round teeth, as shown. G represents a plate or bar made slightly concavo-convex, and provided with teeth on both its longitudinal edges, forming a cutter for weeds, &c. This cutter is attached to a frame, H, which is secured to the bar C, in the manner before described. A plow or any other desired implement may be attached in the same manner to the handle.

Having thus fully described my invention, what I claim as new, and desire to secure by Letters Patent, is—

The combination of handle B, ferrule A, bar C, bolts $a\ a$, nuts $b\ b$, hoe D, and rake E, all arranged as described, and for the purpose set forth.

In testimony that I claim the foregoing as my own I affix my signature in presence of two witnesses.

JOHN M. LUNGUEST.

Witnesses:
W. D. ELLIS,
W. A. TIGNER.